United States Patent [19]
van den Berg

[11] 3,966,049
[45] June 29, 1976

[54] APPARATUS FOR SORTING EGGS AS TO WEIGHT

[75] Inventor: Christiaan van den Berg, Nunspeet, Netherlands

[73] Assignee: Big Dutchman (International) A.G., Chur, Switzerland

[22] Filed: Nov. 15, 1974

[21] Appl. No.: 524,221

[30] Foreign Application Priority Data
Nov. 15, 1976 Netherlands.................... 7315648

[52] U.S. Cl. ................................ 209/121; 209/73; 214/1 BT; 198/179; 177/DIG. 6
[51] Int. Cl.² ...................... B07C 5/16; A01K 43/08
[58] Field of Search ................ 209/73, 74 R, 74 M, 209/121; 221/211; 214/1 BS, 1 BT; 198/179; 177/DIG. 6

[56] References Cited
UNITED STATES PATENTS

| | | | |
|---|---|---|---|
| 2,606,658 | 8/1952 | Powell | 209/121 X |
| 2,798,757 | 7/1957 | Jackson | 214/1 BT |
| 3,275,136 | 9/1966 | Allen et al. | 209/74 R |
| 3,825,085 | 7/1974 | Martin | 177/DIG. 6 |
| 3,858,709 | 1/1975 | Banyas et al. | 198/179 X |

Primary Examiner—Reeves, Robert B.
Assistant Examiner—Joseph J. Rolla
Attorney, Agent, or Firm—Price, Heneveld, Huizenga & Cooper

[57] ABSTRACT

The subject apparatus includes an egg receiver, an egg weighing device having an egg carrier, a conveyor belt for transporting a weighed egg, an ejector for ejecting weighed eggs from the conveyor and a collector of the weighed eggs. The improvement has an electronic weighing device having a vertically moveable lifting frame with a receiver cooperating with the egg-carrier. The lifting frame includes an interconnected lifting arm synchronously moveable with a conveyor horizontally moveable to and fro and a linking element along the collector having a vacuum control suction cup controlled by a pair of bellows cooperating synchronously with the egg carrier to receive an egg.

15 Claims, 9 Drawing Figures

APPARATUS FOR SORTING EGGS AS TO WEIGHT

The present invention relates to an apparatus for sorting eggs as to weight comprising an egg-receiver, a weighing member having an egg carrier, an electric motor-driven conveyor for a weighed egg, an ejector to eject a weighed egg from the conveyor, and a collector of weighed eggs.

Such an apparatus is generally known.

The present invention supplies a novel and inventive egg-sorting apparatus which provides a greater degree of accuracy to sort (½ g) eggs as to weight, the capacity of the apparatus and accuracy of weighing being increased.

The apparatus according to the present invention is characterized by an electronic weighing means comprising a vertically movable lifting frame having an egg receiving member co-operating with the egg-carrier, said lifting frame being mechanically connected with a lifting arm which is synchronously movable with a selection conveyor comprising a frame, said conveyor being horizontally movable to and fro by means of an endless chain and a linking element along an egg collector, said collector comprising a suction cup controllable by a pair of vacuum bellows for picking up an egg, said suction cup co-operating synchronously with the egg carrier.

The present invention will be further elucidated along the lines of the accompanying drawings.

The eggs are mechanically taken from egg-stands by a member (not shown) and put one after the other onto a receiver (68) positioned at the top of a lifting frame 38 vertically movable in a support frame 42.

Figure 1:
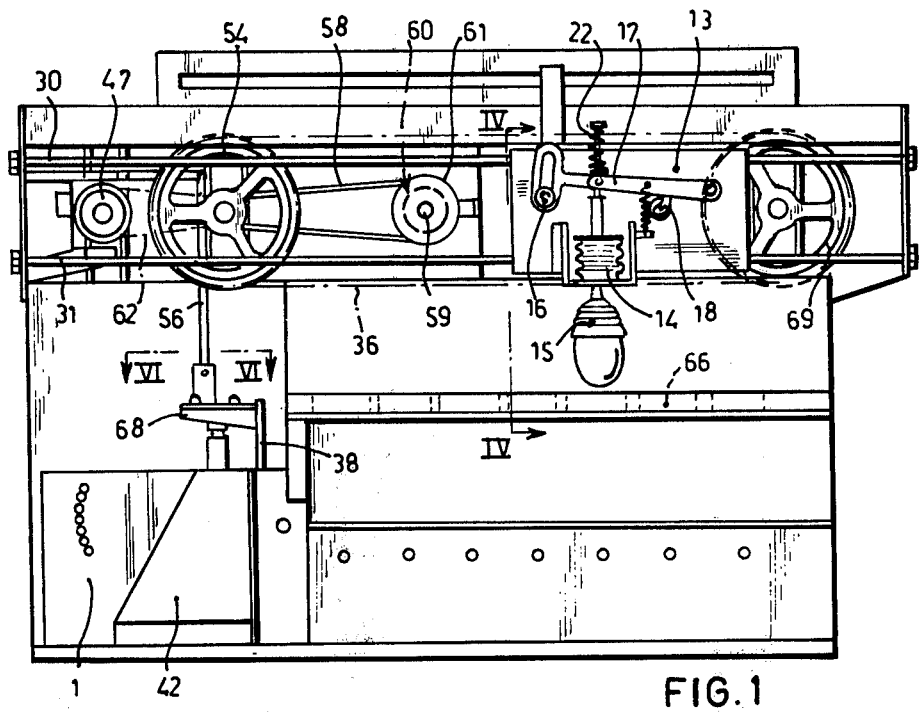
FIG. 1 shows diagrammetically a front view of the apparatus according to the invention.
Figure 2:
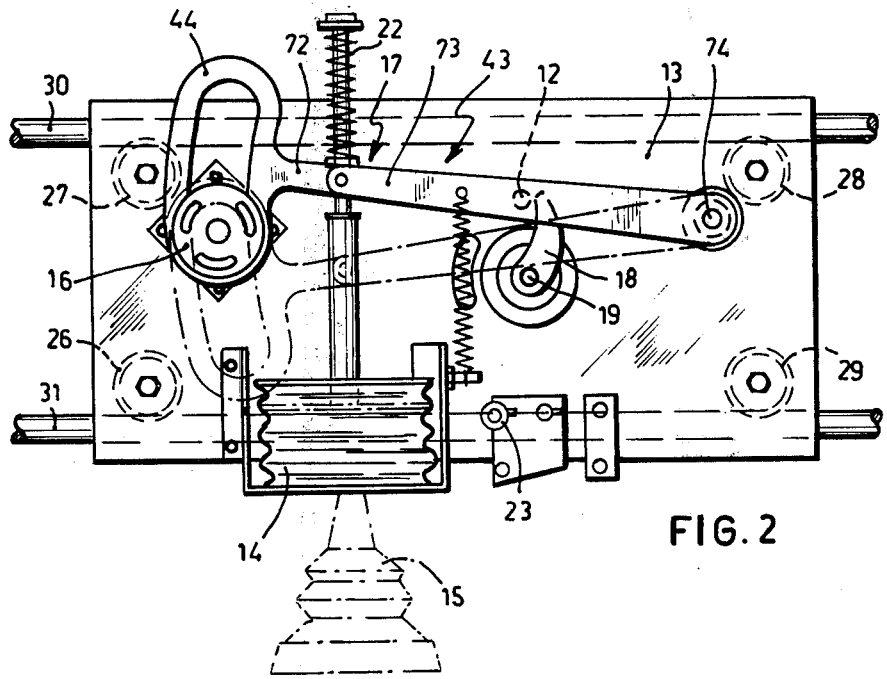
FIG. 2 shows diagrammetically a view of the conveyor that is applied in the apparatus according to the invention.
Figure 3:
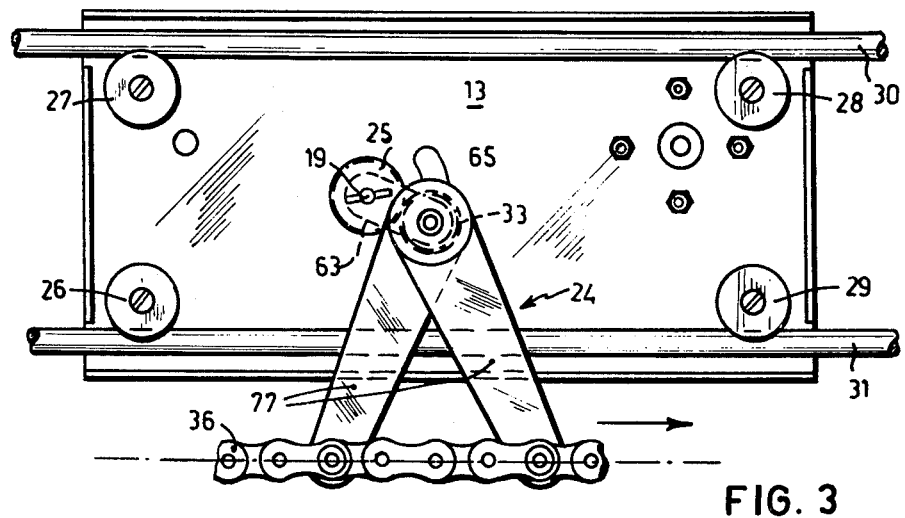
FIG. 3 shows the rear view of the conveyor according to FIG. 2.
Figure 4:
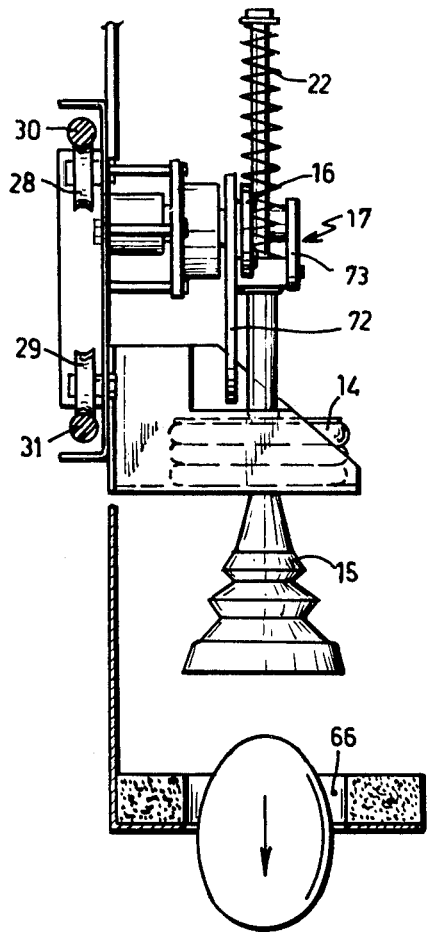
FIG. 4 shows a side view of the conveyor according to FIG. 1 along the arrows IV—IV of FIG. 1.
Figure 5:
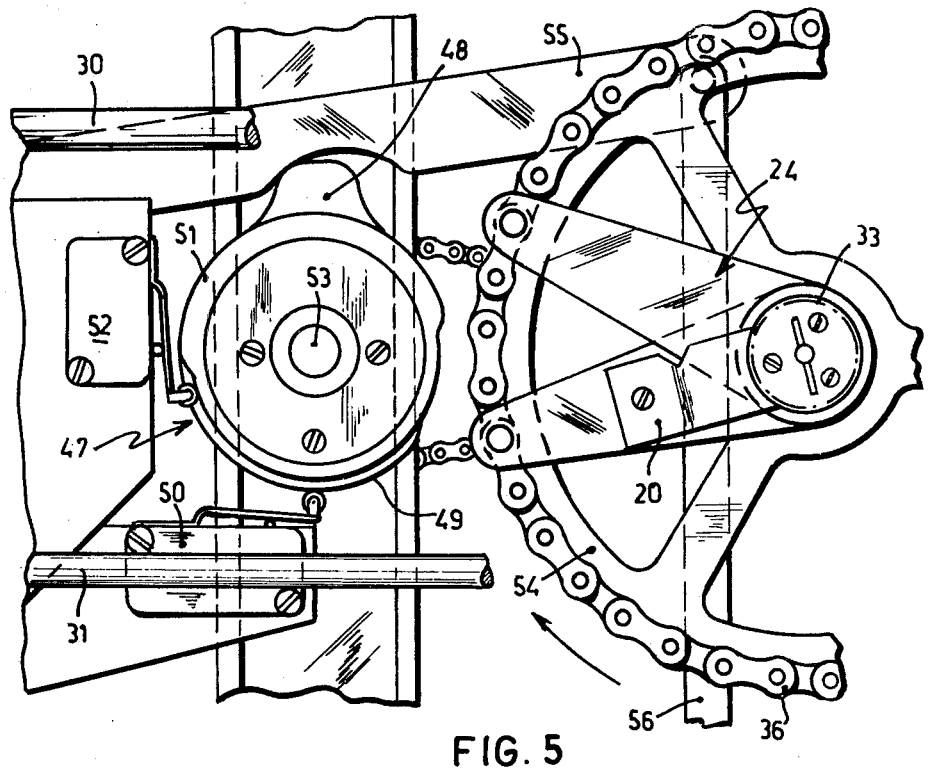
FIG. 5 shows a view in details of the left hand top portion of the apparatus according to FIG. 1, the conveyor being removed.
Figure 6:
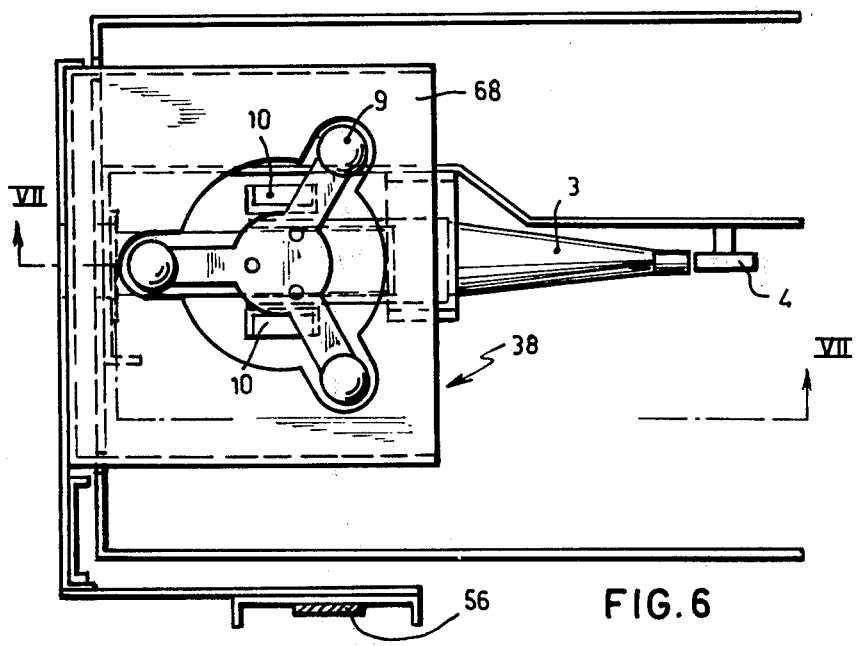
FIG. 6 shows a top view of the lifting frame and the weighing member, along the arrows VI—VI of FIG. 1.
Figure 7:
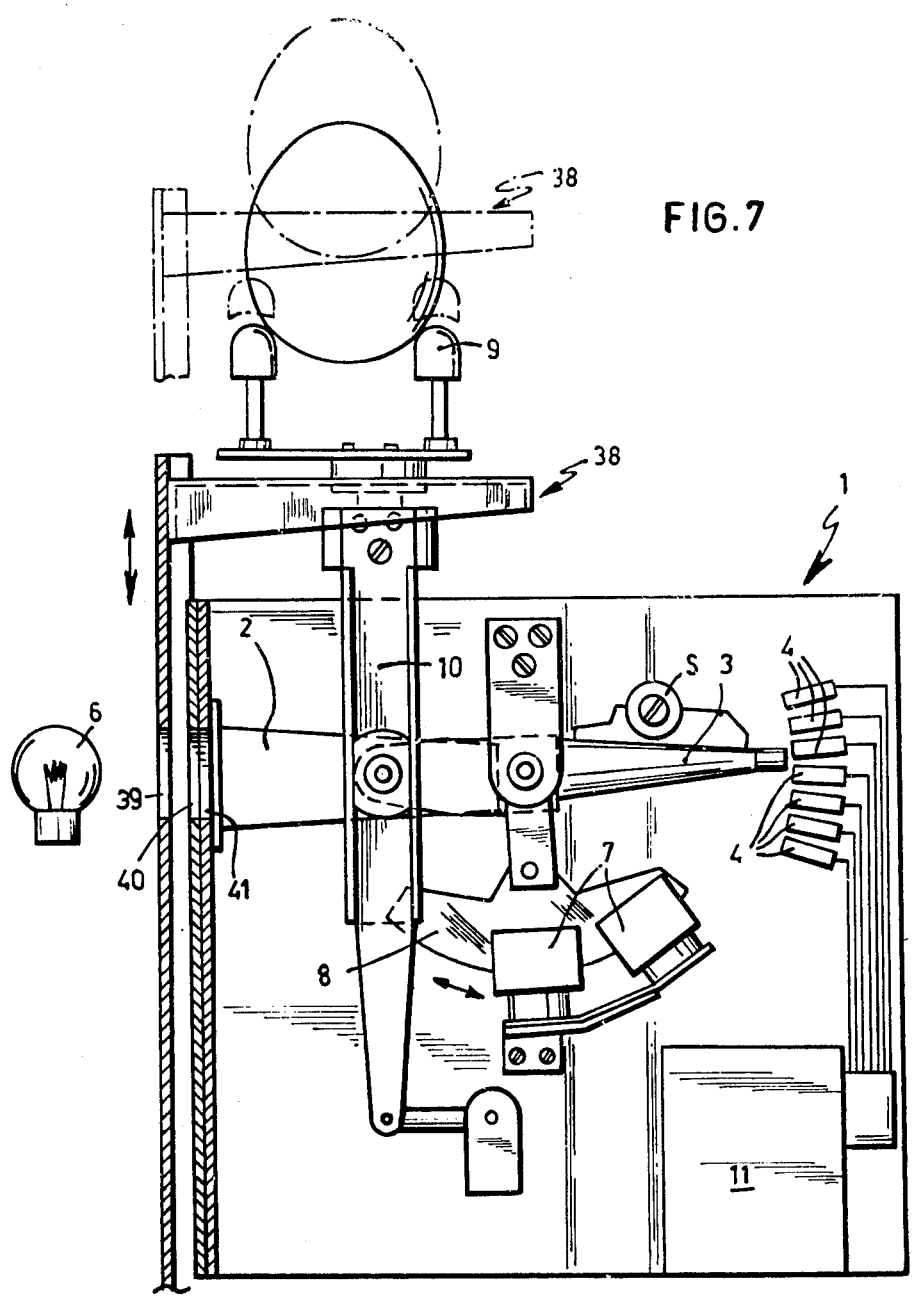
FIG. 7 shows a cross-section through the weighing member and the lifting frame along the arrows VII—VII of FIG. 6.
Figure 8:
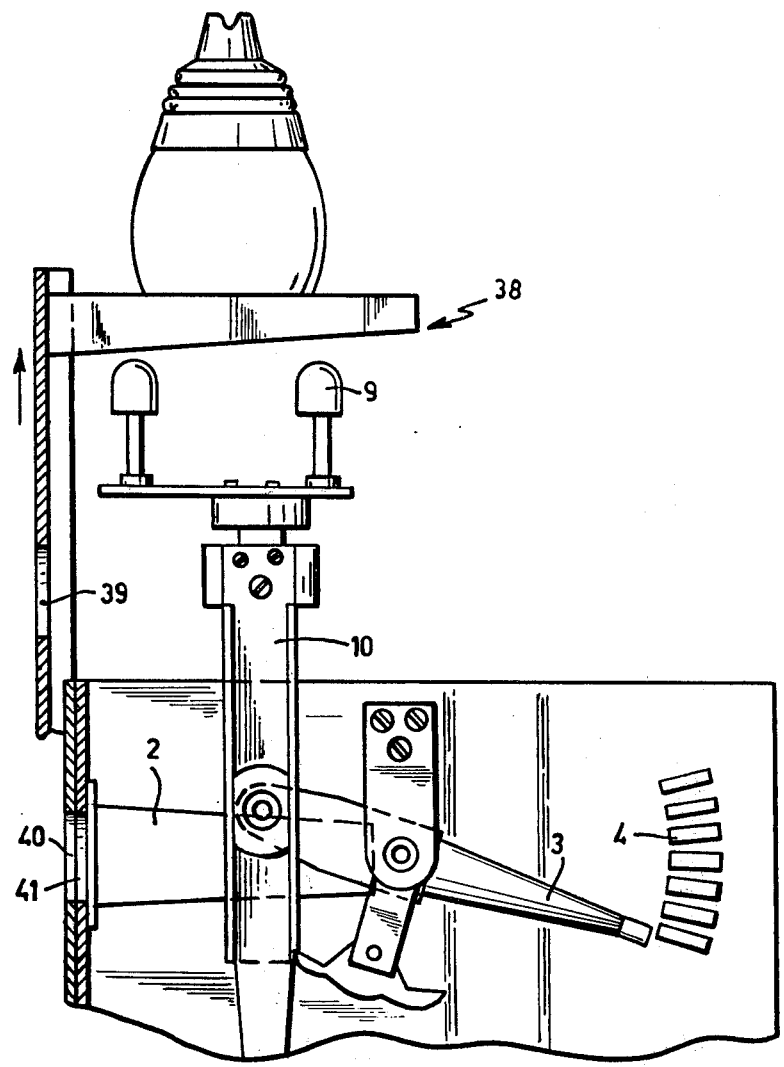
FIG. 8 shows the lifting frame and the weighing member being in such a position as to the lifting frame that an egg is delivered to a suction cup of the conveyor.

The receiver is provided with an orifice 32 through which the egg carrier 9 of the weighing member 1 is vertically movable. The lifting frame also comprises a vertical aperture 39 for transmitting light supplied by a light source 6 positioned in the frame of the sorting apparatus, the support frame 42 of the lifting frame also being provided with a vertical light transmitting aperture 40. The weighing member 1 also comprises a light transmitting aperture 41 and comprises a light conductor 3 rotatable around a horizontal shaft, said conductor being adapted to receive light from a stationary light conductor 2. The light passing through the light conductor 3 on photocells 4 which cells are electrically connected with a memory means 11 (FIG. 7) collecting the weight of a weighed egg in its memory. The light conductor is provided with a counterweight 5 and with brake discs 8. The light conductor is rotatably connected with the egg carrier by a vertical rod 10. The lifting frame 38 is rotatably connected, by means of a vertical connection rod 56 with a lifting arm 55 rotatably arranged in the housing of the sorting apparatus. The lifting arm 55 is controlled by a rotatable cam disc 48 which is rotatable around the shaft 53 and is indirectly driven by the motor 60.

The cam disc 48 together with cam discs 49 and 51 are arranged on the same shaft and together they form the control member 47. The cam disc 49 controls a micro-switch 50 for controlling the number of revolutions of the motor 60, the cam disc 51 controls the micro-switch 52 for interrupting the negative or mass of a magnet 16. The cam discs are mutually and with respect to the shaft 53 adjustable. The operation of the cam discs is such that when the suction cup 15 is in an egg-receiving position, the lifting frame 38 is in its uppermost position and the magnet 16 brings a lifting arm 17, arranged on the conveyor, to control a pair of vacuum bellows 14 in its uppermost position.

The conveyor 13 comprises a frame being mounted via a linking element 24 on an endless chain 36, said chain being driven by the motor 60 and is movable via sprocket wheels 54, 69, of which the sprocket wheel 54 is driven by the motor 60.

One end of each of the two legs 77 of the linking element 24 are rotatably mounted on the drive chain 36 and their coinciding other ends are rotatably mounted on a shaft 67 which is arranged in a slot 65 of the conveyor frame and on which a sprocket wheel 33 is rotatable, said sprocket wheel being fixed on an arm of the linking element 24 and engaging a sprocket wheel 25 to drive a rotatable control member 4 for the vacuum bellows 14. This control member comprises a lifting arm 17 rotatable on an end to control a pair of vacuum bellows 14, said lifting arm comprising two diverging arms being unequal rigidly interconnected, the end of the longer arm 72 remote from its point of rotation 74 is provided with a closed bow, wherein a magnet 16 can be shifted to keep the lifting arm 14 in its uppermost position, on the shorter arm's end 73 remote from its point of rotation, an elastic vertical control rod 22 for the vacuum bellows 14 is mounted, while between the point of rotation 74 of the shorter arm and the longer arm and the control rod a pin 12 is mounted on the arms, said pin is adapted to engage a rotatable cam 18 driven by a sprocket wheel 25.

The conveyor 13 can be guided via two parallel guide bars 30, 31 by means of wheels 26, 27, 28 and 29.

The sprocket wheels 25 and 33 are arranged on a coupling member 63 that is rotatably fixed on the shaft 19.

The apparatus operates as follows.

When an egg is put down on the lifting frame 38 and the carrier 9 has lifted the egg in its upward movement through the opening of the receiver of the lifting frame and then is lowered, the light conductor 3 is going to rotate and this comes to a standstill. Thereupon the lifting frame 38 is lowered a few centimeters' distance to its bottommost position. In said stationary positions the light transmission apertures 39, 40, 41 are aligned and light from the light source 6, via a stationary light conductor 2 having a lense system, will beam through the rotatable light conductor and impinge one of the photo cells 4. The weight of the weighed egg is communicated by the photocell to the memory 11, which adjusts, dependent on said weight, the micro-switch of the relative cavity of the egg collector to receive the weighed egg. When an egg carrier 9 is positioned in its uppermost position carrying an egg, during a quater revolution of the linking element 24 with the arms 77 by means of the sprocket wheel 25 and a transmission the cam 18, engaged with the pin 12 of the control member 43, is rotated into the uppermost position, so that the vacuum bellows 14 is entirely extended and enough vacuum is produced in the suction cup 15 to carry the egg and to hold it. At this moment the magnet 16 is excited by the micro-switch 52 so that the magnet 16 maintains the lifting arm 17 in its uppermost position, until the weighed egg has reached its destination in the collecting means by the conveyor. The egg ejection occurs by the impact pin 23 which is engaged with a micro-switch arranged near a sorting orifice 66, said switch being adapted to interrupt the excitation of the magnet 16, dependent on the memory-position adjusted with the preceding weighing via a relay. There is such a micro-switch at every sorting orifice which can operate in the same way.

The chain 36 is continuously advancing, and when the movement of the linking element 24 is transfered from a straight movement into a curvilinear movement (half the periphery of a gear) and reverse, the gear 33 will remain stationary and rotate around the center of the corresponding gear and the gear 25 continuously engaged with said gear 33 will start to rotate around the shaft 19 attached half-way the conveyor with the cam 18, in order to produce the desired vacuum in the vacuum bellows 14. The curvilinear movement of the linking element 24 over the mentioned half periphery of the gear is used by the lifting frame 38 to issue the egg in question to the suction cup 15.

The linking movement of the arms 77 is adapted to receive the differences in position which occur between the transfer of the mentioned straight movement into a curvilinear movement. In connection herewith an arm comprises a notch.

The cam disc 49 controls, by means of the micro-switch 50, the number of revolutions of the motor 60 in such a way that during transport of an egg to its distination, the conveyor is moving with an adapted speed and will return with twice its speed to the lever frame, to receive another egg.

The cam disc 48 controls the lever arm 55 which takes care of a synchronous upward and downward movement of the lifting frame 38 by a connection rod 56.

The cam disc 51 controls the micro-switch 52 which eliminates the magnet excitation 16 when an egg is put down onto the collector and the weight of a next egg is communicated to the memory of the weighing member, the magnet 16 may only be operated when the lifting frame 38 presses an egg into the suction cup 15. At that moment the micro-switch 52 is closed by the cam disc 51 and the magnet 16 can take the lifting arm in its highest position. When an egg is put down on the receiving face 68 of the lifting frame 38, the receiving face 68 will be lowered and the egg is put down onto the egg carrier 9, the egg will remain there during its weighing period, next the receiving face 68 is lifted again and the egg is discharged from the egg carrier 9 and pressed into the suction cup 15. The egg carrier is displaceable by the receiving face 68 of the lifting frame 38.

The motor 60 is arranged at the rear of the conveyor 13 and is driving, with a V-rope, the shaft of the sprocket 54.

Said shaft is connected by means of a chain with the shaft 53 of the rotatable control member 47 having cam discs. The rotatable control member 47, is, however, connected via a sprocket wheel with chain with the rotatable cam 18.

Owing to the fact that all movements are synchronized the desired operations and movements can always be carried out at the right moment.

When the weight of an egg is such that the rotatable light conductor is positioned between two adjacent photo cells two weight-quantities will always be communicated to the memory, so that the processing of an unidentified egg is excluded.

The weighing member having a memory, is intended for use with seven classes of weight. Said classes of weight can be e.g. 0–45 g; 45–50 g; 50–55 g; 55–60 g; 60–65; 65–70 g. and 70 g and more.

Figure 9:
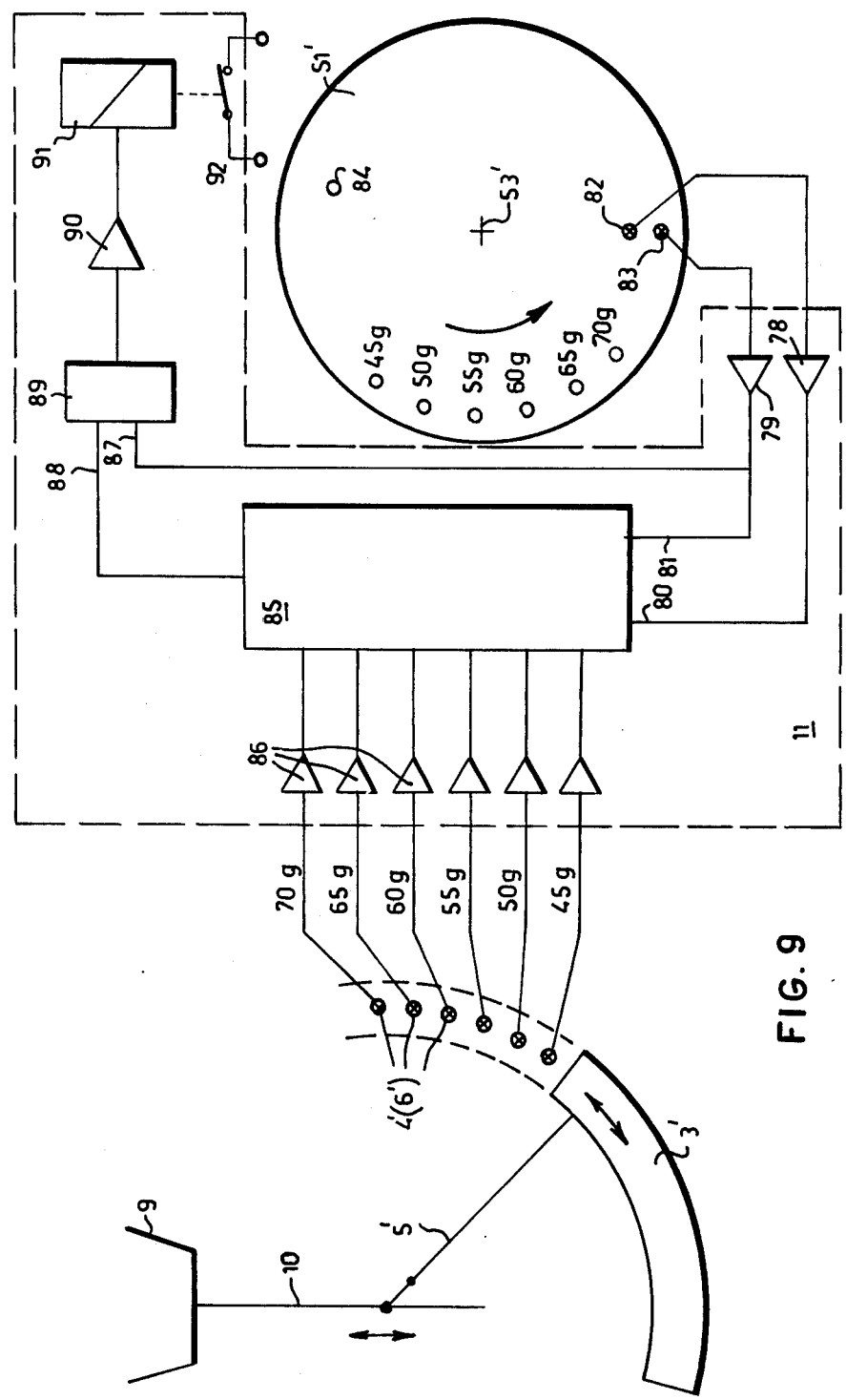
FIG. 9 shows diagrammatically another embodiment of the weighing member that is applied in the apparatus according to the invention.

Besides, in the way as described above, the distribution of the weighed eggs over the sorting orifices can take place with a weighing member as shown diagrammatically in FIG. 9. In the support frame 42 the vertically movable carrier rod 10 of the egg carrier 9 is received in a balance arm provided with a counterweight having a gauging rod 3' which co-operates with a light scanner 4', 6', opposite each light receiving element 4' a light source 6' is arranged within a flat ring, said ring can be traversed by the gauging rod 3' in such a way that the gauging rod is shifting between the row of light sources and the row of light receiving elements.

The numbers of pairs of light sources and light receiving elements are equal to the limits between the classes of weight. Each pair is connected with a shift register 85 wherein the position of the light receiving element can determine the position of a bistable element.

Between everylight receiving element 4' and the corresponding input of the shift register 85 an amplifier 86 is circuited.

A control disc 51' is linked with the drive of the selection-conveyor 13 which disc is rotatable around a shaft 53'.

In the control disc light passages are arranged, of which in the example discussed here six passages are arranged such that said passages represent the distance between successive sorting orifices 66. A light passage 84 is arranged in a different circle. The control disc passes between two pairs of a light source and a light receiving element 92, 83, which are respectively spaced from the shaft 53' which corresponds to the circles on which the orifice 84 and the row of orifices are positioned.

The light receiving element in the pair 82 is connected via an amplifier 78 with a record input 80 of the shiftable register 85. The light receiving element in the pair 83 is connected via an amplifier 79 with a clock pulse input of the shiftable register 85 and with an input 87 of an AND gate 89. The other input 88 of the AND gate 89 is connected with the output of the last bistable element in the shiftable register 85. The output of the AND gate 89 is connected via an amplifier 90 with a relay coil 91 which opens by excitation a contact 92 in the excitation-circuit of the magnet 16.

In a variant of the embodiment according to FIG. 9 the gauging rod 3' is provided with a scale division of the so-called "Gray" type code, the light scanner comprising accordingly light receiving elements, and the memory comprising a counter instead of a shift register.

What is claimed is:

1. In an egg sorting apparatus responsive to the weight of the eggs having an egg receiver, a weighing means having an egg carrier, a power driven conveyor for transporting a weighed egg, an ejector for ejecting a weighed egg from said conveyor and a collector of weighed eggs, the improvement comprising: an electronic weighing means having a vertically moveable lifting frame coupled with said egg receiver and cooperating with said egg carrier, said lifting frame being interconnected with a lifting arm which is synchronously moveable with said power driven conveyor, said power driven conveyor including a frame and being horizontally moveable to and fro, drive means for said conveyor, said drive means including a linking element for moving said conveyor along said egg collector, said collector including a suction cup controlled by a pair of vacuum bellows to receive an egg, said suction cup cooperating synchronously with said egg carrier.

2. Apparatus according to claim 1 wherein said egg collector includes a plurality of sorting orifices; switch means cooperative with each of said sorting orifices; said conveyor being provided with an impact pin adapted to be engaged with said switch means cooperative with said sorting orifices whereby to eject a weighed egg in a selected one of said orifices.

3. Apparatus according to claim 1 wherein said linking element is provided with a pair of arm members rotatable around a mutual shaft, one end of each of said arm members being pivotally attached to said drive means, said conveyor frame having a slot formed therein, said shaft being arranged in said slot, a sprocket wheel rotatable on said shaft, said sprocket wheel being fixed on said linking element and being engaged with a gear on a gear shaft, said gear and gear shaft being operably connected to drive a rotatable cam disc for controlling the vacuum in said vacuum bellows to control said suction cup.

4. Apparatus according to claim 3 wherein said sprocket and said gear are arranged on a coupling member rotatable on said gear shaft, said shaft of said sprocket being moveable in said slot in said conveyor frame, said conveyor being mounted for horizontal movement along a pair of horizontal guide bars.

5. Apparatus according to claim 3 wherein said drive means for said conveyor includes an endless chain engageable with a pair of sprocket wheels, and motor means for driving at least one of said sprocket wheels.

6. Apparatus according to claim 5 and further including control means for said vacuum bellows said control means comprising lifting arm means for said vacuum bellows, said lifting arm means comprising a pair of pivotally mounted, rigidly interconnected linking arms, one of said linking arms being longer than the other of said linking arms, the end of the longer linking arm remote from its pivotal mounting point being provided with a closed bow; a magnet positioned in said bow, said bow being shiftable with respect to said magnet to keep said lifting arm means in its uppermost position when said magnet is energized, the end of said other arm remote from its pivotal mounting point having a biased vertical control rod attached thereto for controlling said vacuum bellows.

7. Apparatus according to claim 6 and further including control means including a control shaft; means operatively connecting said control shaft to said motor means; a plurality of adjustable cam discs are mounted on said control shaft, one of said cam discs adapted for controlling the vertical movement of said lifting frame, a second one of said cam discs being adapted to control a switch for said motor, and a third one of said cam discs being adapted to control a second switch operatively connected to energize and deenergize said magnet, whereby when said suction cup is in an egg receiving position, said lifting frame is positioned in its uppermost position, and said magnet holds said lifting arm means in its highest position.

8. Apparatus according to claim 7 wherein said one cam disc is engageable with said frame lifting arm, said lifting arm being connected by a connection rod with said lifting frame.

9. Apparatus according to claim 1 wherein said egg collector includes a plurality of sorting orifices, said weighing means being mounted on a support frame for a vertically moveable carrier rod on said egg carrier, said rod comprising a counter-weighted balance arm having gauging means which cooperates with light scanner means, said scanner means comprising a plurality of light responsive means which correspond each to an egg-weight limit, said scanner means being connected with memory means having a position for each of said sorting orifices, each corresponding to one class of weight, and means to clock said memory means synchronous with the displacement of said power driven conveyor along said sorting orifices, the latter being arranged in a row beside each other.

10. Apparatus according to claim 9 wherein said gauging means includes a rotatable light conductor, said light scanner means comprises a number of light receiving elements, said receiving elements having light sensitive surfaces arranged according to classes of weight, said light conductor being rotatably mounted on a balance arm and adapted to direct light from a light source onto said sensitive surface of said receiving elements.

11. Apparatus according to claim 9 wherein said gauging means has a scale division adapted to the "Gray" code, and said memory means comprises a counter.

12. Apparatus according to claim 9 wherein said gauging means includes a rotatable mask, said scanner means comprises a plurality of light sources and an identical number of light receiving elements for distribution in weight classes, said receiving elements having light sensitive surfaces, said light sources and said light receiving elements being arranged in a row opposite each other, said mask being mounted on said balance arm for movement therewith and adapted to intercept light from one of said plurality of light sources directed to the light sensitive surface of a corresponding light receiving element.

13. Apparatus according to claim 12 wherein said light sources are light-transmitting diodes and said light-receiving elements are photo-transistors tuned to said diodes as to light-sensitivity.

14. Apparatus according to claim 9 wherein said memory means comprises as many bistable elements as light-receiving elements, said bistable elements being connected as a shift register and being masked by said gauging means and adapted to excite a relay to deenergize a magnet.

15. Apparatus according to claim 14 wherein said power driven conveyor is coupled with a control member comprising a control disc rotatable about a control shaft, said disc having a plurality of light passages formed therein; at least one light-receiving element to detect the light falling through said light passages, said light passages being arranged along an arc on said disc whereby with rotation of said disc, a recording pulse and clock pulse are successively supplied to record a class of weight and to clock said shift register, said clock-pulse passages being arranged in accordance with the positions of said sorting orifices and the positioning of said recording pulse passage corresponds to a rest-position of said balance arm after an egg is laid thereon.

* * * * *